United States Patent Office 2,935,506
Patented May 3, 1960

2,935,506

NEW DYESTUFFS AND PROCESS FOR DYEING THEREWITH

Robert Norman Heslop, Norman Legg, Jack Frankland Mawson, William Elliot Stephen, and James Wardleworth, all of Manchester, England, assignors to Imperial Chemical Industries Limited, London, England, a corporation of Great Britain No Drawing. Application August 26, 1957
Serial No. 680,398

Claims priority, application Great Britain September 4, 1956

11 Claims. (Cl. 260—154)

The invention relates to new dyestuffs and a process for dyeing therewith and more especially it relates to new dyestuffs containing halogeno-pyrimidine rings and the process for colouring cellulosic textile materials therewith.

It has previously been proposed to manufacture dyestuffs by causing to react together pyrimidine compounds containing reactive halogen atoms and aminoazo or aminoanthraquinone compounds but no dyestuffs have hitherto been described which contain di-halogenopyrimidine radicals.

It has now been found that water-soluble dyestuffs may be obtained by the interaction of equimolecular proportions of 2:4:6-trihalogenopyrimidines and water-soluble coloured compounds which contain an amino group with at least one hydrogen atom attached to the nitrogen atom, and the water-soluble dyestuffs so obtained when applied in conjunction with a treatment with an acid-binding agent to cellulosic textile materials give colourations which have better fastness to wet treatments than those obtained from previously described water-soluble dyestuffs containing pyrimidine rings applied in the same manner.

According to the invention there are provided as new dyestuffs the 2:6-dihalogeno-4-pyrimidylamino- or the 4:6-dihalogeno-2-pyrimidylamino- derivatives of water-soluble coloured compounds.

The new dyestuffs may be obtained by the interaction of at least one molecular proportion of 2:4:6-trihalogenopyrimidines with one molecular proportion of water-soluble coloured compounds containing at least one mono-substituted or unsubstituted amino group and isolating the dihalogeno-pyrimidyl derivatives of the water-soluble compounds.

Suitable 2:4:6-trihalogenopyrimidines include, for example, 2:4:6-trichloropyrimidine and 2:4:6-tribromopyrimidine.

The water-soluble coloured compound may be a member of any of the known dyestuff series, for example the azo, anthraquinone, phthalocyanine or nitro series, containing one or more amino groups of the type defined above, and one or more ionogenic solubilising groups such as sulphonic acid or carboxylic acid groups.

The coloured compounds of the azo series containing amino groups which may be used as starting materials in the above process may be obtained by a variety of methods. One method is to diazotise and aromatic primary amine and couple the diazonium compound so obtained with a coupling component containing an amino or mono-substituted amino group which after the coupling operation remains free to react, either the aromatic primary amine, or the coupling component, or both, containing at least one ionogenic solubilising group. Suitable aromatic primary amines which may be used in this manner to obtain the aminoazo compounds include, for example, aniline, o-, m- and p-toluidines, o-, m- and p-anisidines, o-, m- and p-chloroanilines, 2:5-dichloroaniline, α- and β-naphthylamine, 2:5-dimethylanilme, 5-nitro-2-aminoanisole, 4-aminodiphenyl, aniline-2-, 3- and 4-carboxylic acids, 2-aminodiphenylether, 2-3- or 4-aminobenzene sulphonamide or sulphonmonomethyl- or ethyl-amides or sulphon-di-methyl- or -ethyl-amides, dihydrothio-p-toluidine monosulphonic acid or dihydrothio-p-toluidine disulphonic acid, aniline-2-, -3- and -4-sulphonic acids, aniline 2:5-disulphonic acid, 2:4-dimethylaniline-6-sulphonic acid, 3-aminobenzotrifluoride - 4 - sulphonic acid, 4 - chloro - 5-methylaniline-2-sulphonic acid, 5-chloro-4-methylaniline-2-sulphonic acid, 3-acetylamino-aniline-6-sulphonic acid, 4-acetylamino-aniline-2-sulphonic acid, 4-chloroaniline-2-sulphonic acid, 3:4-dichloroaniline-6-sulphonic acid, 4-methylaniline-2-sulphonic acid, 3-methylaniline-6-sulphonic acid, 2:4-dimethoxyaniline-6-sulphonic acid, 4-methoxyaniline-2-sulphonic acid and 5-methoxyaniline-2-sulphonic acid, 2:5-dichloroaniline-4-sulphonic acid, 2-naphthylamine-4:8- and 6:8-disulphonic acids, 1-naphthylamine-2-, 4-, 5-, 6- or 7-monosulphonic acid, 1-naphthylamine-3:6-disulphonic acid, 2-naphthylamine 3:6- and 5:7-disulphonic acids and 2-naphthylamine-3:6:8-trisulphonic acid, m- and p-nitroaniline, 4-nitro-aniline-2-sulphonic acid and 3-nitroaniline-6-sulphonic acid, m- or p-aminoacetanilide, 4-amino-2-acetylaminotoluene - 5 - sulphonic acid.

Suitable coupling components include for example, 2-amino- and 2-methylamino-5-naphthol-7-sulphonic acids, 2-amino and 2-methylamino-8-naphthol-6-sulpohnic acids, 1-amino- and 1-ethylamino-8-naphthol-6-sulphonic acids and the corresponding 3:6- and 4:6-disulphonic acids, 1-, 3'- or 4'-aminobenzoylamino-8-naphthol-3:6- and 4:6-disulphonic acids, aniline, o- and m-anisidines, o- and m-toluidines, 2:5-dimethylaniline, 3-amino-4-methoxytoluene, 2:5-dimethoxyaniline, N-methylaniline, N-ethyl-o-toluidine, N-methyl-m-anisidine, 3-methylamino-4-methoxytoluene, 1-(3'-aminophenyl)-3-methyl-, carboxy, and carboethoxy-5-pyrazolones, 1-(4'-aminophenyl)-3-methyl-, carboxy-, and carboethoxy-5-pyrazolones and 1-(4'-amino-3'-carboxyphenyl)-3-methyl-5-pyrazolone.

The aminoazo compounds which are to be interacted with the trihalogeno-pyrimidine are not restricted to compounds containing only one azo group. Suitable disazo compounds which may be used may be obtained for example by tetrazotisation of an aromatic diamine containing two primary amino groups and coupling the tetrazo compound so obtained with 2 molecular proportions of one of the above-defined coupling components or with 1 molecular proportion of each of two of the above-defined coupling components or with one molecular proportion of one of the above-defined coupling components and with one molecular proportion of a coupling component not containing an amino group, it being understood that the aromatic diamine or the coupling component (or at least one of the coupling components when two different coupling components are used) contains at least one ionogenic solubilising group. Suitable aromatic diamines include, for example: benzidine, 3:3'-dimethoxybenzidine, benzidine-2:2'-disulphonic acid, benzidine-3:3'-dicarboxylic acid, benzidine-3:3'-diglycollic acid and 4:4'-diaminostilbene-2:2'-disulphonic acid.

Alternatively suitable disazo or polyazo compounds may be obtained by the use of primary aromatic amines or diamines containing azo groups in the above-described processes. As examples of suitable primary aromatic amines or diamines containing azo groups which may be used there may be mentioned 4-aminoazobenzene-4'-sulphonic acid, 4'-amino-2'-methylphenylazo-2-naphthalene-4:8-disulphonic acid and 4-amino-3-methoxy-2-methyl-4'-nitro-2'-sulphoazobenzene.

A similar method of obtaining the coloured compounds of the azo series which may be used as starting materials comprises coupling a coupling component which optionally contains an amino or mono-substituted amino group with a diazonium compound which contains an amino or mono-substituted amino group, either the coupling component or the diazonium compound, or both containing at least one ionogenic solubilising group. Such diazonium compounds may be obtained by methods known from the art, by the diazotisation of aromatic primary amines containing a second amino group or containing a mono-substituted amino group. Suitable aromatic primary amines include, for example p-phenylene diamine, 1:4-phenylenediamine-2-sulphonic acid, 1:4-phenylenediamine-2-carboxylic acid and 1:4-diaminonaphthalene-2-sulphonic acid. As examples of coupling components which may be used in this manner, there may be mentioned the coupling components listed above and also β-naphthol, 2-naphthol-6- or 7-sulphonic acid, 2-naphthol-3:6- or 6:8 disulphonic acids, 1-naphthol-4-sulphonic acid, 1-phenyl-3-methyl-5-pyrazolone, 1-4'-sulphophenyl-3-methyl-5-pyrazolone, 1-(2':5'-dichloro-4'-sulphophenyl)-3-methyl-5-pyrazolone, 2-benzoylamino-5-naphthol-7-sulphonic acid, 1-benzylamino 8-naphthol-3:6 or 4:6-disulphonic acid, phenol, p-cresol, acetoacetanilide and acetoacet-2-methoxyanilide-5-sulphonic acid.

A further method of obtaining the coloured compounds of the azo series which may be used as starting materials is to treat an azo or polyazo compound containing at least one ionogenic solubilising group and also containing at least one acylamino group with aqueous acid or aqueous alkali in order to cause hydrolysis of the acylamino group or groups. Suitable azo or polyazo compounds may be obtained from aromatic primary amines and/or coupling components containing acylamino groups. Suitable aromatic primary amines in addition to the acylaminoarylamines mentioned above include, for example, mono-acetylbenzidine, 4-amino-1-acetylaminonaphthalene-6-sulphonic acid, 4-amino-4'-acetylaminodiphenyl-3-sulphonic acid, 4-amino-4'-acetylamino-stilbene-2:2'-disulphonic acid, and suitable coupling components include, for example 2-acetylamino-5-naphthol-7-sulphonic acid, 2-acetylmethylamino-5-naphthol-7-sulphonic acid, 2-acetylamino- and acetylmethylamino-8-naphthol-6-sulphonic acids and 1-acetylamino-8-naphthol-3:6- and 4:6-disulphonic acids.

Yet a further method of obtaining the coloured compounds of the azo series which may be used as starting materials is to treat an azo or polyazo compound containing at least one ionogenic solubilising group and also containing at least one nitro group attached to an aromatic ring, with a reducing agent for example sodium sulphide, sodium hydrogen sulphide or sodium di- or polysulphides, known to be capable of reducing an aromatic nitro compound to the corresponding amino compound.

Suitable coloured compounds of the anthraquinone series which may be used as starting materials for making the new dyestuff of the invention are those containing an amino group or a mono-substituted amino group as substituents in an alkylamino or an arylamino group attached to an alpha-position of the anthraquinone nucleus and also containing at least one ionogenic solubilising group. As examples there may be mentioned 1-amino-4-(4'-aminoanilino-) anthraquinone 2:3'-disulphonic acid and the corresponding 2:3':5- and 2:3':6-trisulphonic acids, 1-amino-4-(4''-amino-4'-benzoylaminoaniline)-anthraquinone-2:3-disulphonic acid and the corresponding 2:3':5-trisulphonic acid, 1-amino-4-[4'-(4''-aminophenylazo-)anilino-]anthraquinone-2:2''-5-trisulphonic acid, 1-amino-4-(4'-amino-3'-carboxyanilino-)anthraquinone-2:5-disulphonic acid, 1-amino-4-(3'-aminoanilino)anthraquinone-2:4':5-trisulphonic acid and the corresponding 2:4'-disulphonic acid, 1-amino-4-[4'-(4''-aminophenyl-)anilino-]anthraquinone-2:3'':5-trisulphonic acid, 1-amino-4-(4'-methylamino)anilino-anthraquinone-2:3'-disulphonic acid and the corresponding 2:3':5-trisulphonic acid, 1-amino-4-(4'-n-butylamino)anilino-anthraquinone-2:3'-disulphonic acid, 1-amino-4-(4'-methylamino-3'-carboxyanilino-)-2-sulphonic acid and 1-amino-4-(3'-beta-hydroxyethylamino-)anilinoanthraquinone - 2:5 - disulphonic acid, 1-4'-aminoanilinoanthraquinone-2:3'-disulphonic acid and 1-amino-4-(4'-amino-2'-methoxyanilino)anthraquinone-2:3'-disulphonic acid.

These starting materials of the anthraquinone series may themselves be obtained from anthraquinone compounds, containing a halogen atom or a nitro group attached to the appropriate alpha-position of the anthraquinone nucleus, or from the leuco derivative of a 1:4-dihydroxy, -diamino- or -amino-hydroxy-anthraquinone, by interacting the appropriate anthraquinone compound with at least one molecular proportion of an aliphatic or an aromatic diamine, so choosing the starting materials that the ionogenic solubilising group is present in the anthraquinone compound and/or the aliphatic or aromatic diamine. Alternatively an amino anthraquinone compound, optionally carrying one or more ionic solubilising groups may be treated with a sulphonating agent, for example sulphuric acid, chlorosulphuric acid, or oleum, in order to introduce one or more sulphonic acid groups.

Coloured compounds of the phthalocyanine series which may be used as starting materials for making the new dyestuffs of the invention are those containing at least one ionogenic solubilising group and at least one amino, or mono-substituted amino group. The amino or mono-substituted amino group or groups may be attached directly to the benz-rings of the phthalocyanine nucleus or they may be attached thereto through a divalent bridging radical for example, -phenylene-, —CO-phenylene-, —SO₂-phenylene-, —NH-phenylene-, —S-phenylene-, —O-phenylene-, —CH₂S-phenylene-, —CH₂O-phenylene-, —CH₂-phenylene-, —SCH₂-phenylene, —SO₂CH₂-phenylene-, —SO₂NR-phenylene-CH₂—, —SO₂NR - arylene -, —NRCO - phenylene, —NRSO₂-phenylene-, —SO₂O-phenylene-, —CH₂—, —CH₂NR-phenylene, —CH₂NH.CO-phenylene-, —SO₂NR-alkylene-, CH₂NR - alkylene-, —CONR-phenylene-CH₂—, —CONR-arylene-, —SO₂—, and —CO—. In the above divalent bridging radicals, R stands for hydrogen, alkyl or cycloalkyl, arylene stands for an aromatic divalent bridging radical wherein the terminal valence bonds may be attached to the same or different nuclei, and alkylene stands for an aliphatic divalent radical which may include hetero-atoms such as nitrogen as well as carbon in the chain of atoms, for example it may stand for the radical —CH₂CH₂—NH—CH₂CH₂—, and the phenylene groups may be substituted, for example by halogen, alkyl and alkoxy.

As examples of aromatic divalent bridging radicals denoted by arylene there may be mentioned aromatic nuclei, for example a benzene nucleus, a naphthalene nucleus, an acridine nucleus and a carbazole nucleus, which nuclei may bear further substituents, and radicals of the formula:

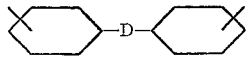

wherein the benzene rings may bear further substituents and where —D— stands for a bridging group, for example —CH=CH—, —NH—, —S—, —O—, —SO₂—, —NO=N—, —N=N—, —NH.CO.NH—, —CO.NH—, —O.CH₂CH₂O— and

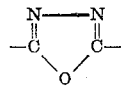

As specific examples of coloured compounds of the phthalocyanine series which may be used in the process of the invention there may be mentioned copper phthalocyanine - 4-N-(4-amino-3-sulphophenyl-)sulphonamide-4''.4'':4''' -trisulphonic acid, cobalt phthalocyanine-4:4'-di-N-(3'-amino-4'-sulphophenyl-) carbonamide-4'':4''' - dicarboxylic acid and copper-4-(4'-amino-3'-sulphobenzoyl-)phthalocyanine.

There may also be used mixtures of aminophthalocyanines, for example there may be used a mixture of approximately equal parts of copper phthalocyanine-N-(4-amino-3-sulphophenyl-)sulphonamide trisulphonic acid and copper phthalocyanine di-[N-(4-amino-3-sulphophenyl-)sulphonamide] disulphonic acid.

The aminophthalocyanines used which contain a sulphonic acid can be manufactured either by the sulphonation of known phthalocyanines containing primary or secondary amino groups or by synthesis from mixtures of phthalic acid derivatives and sulphonated phthalic acid derivatives. Thus treatment with a sulphonating agent for example oleum such as a 20% solution of sulphur trioxide in sulphuric acid of the amines described in United Kingdom specifications Nos. 569,200 and 589,118 gives suitable aminophthalocyanines. The aminophthalocyanine compounds so obtained are those containing the divalent bridging radicals -phenylene-, —CO-phenylene-, —SO₂-phenylene-, —NH-phenylene-, —S-phenylene-, —O-phenylene, —CH₂S-phenylene-, —CH₂O-phenylene, —CH₂-phenylene-, —SCH₂-phenylene- and —SO₂CH₂-phenylene.

Those aminophthalocyanine compounds which contain the divalent bridging radicals mentioned in the last paragraph and also those containing —NRCO-phenylene-, —SO₂NR-phenylene-, —NRSO₂-phenylene-, and SO₂O-phenylene linkages as bridging radicals may be obtained by heating together suitable derivatives of sulphonated phthalic acid and the substituted phthalic acids mentioned in the aforesaid United Kingdom specifications Nos. 569,200 and 589,118 by the general methods known to be used for the manufacture of phthalocyanines from suitable phthalic acid derivatives, for example, by heating together a mixture of 4-sulphophthalic anhydride and 4-p-nitrobenzoylphthalic anhydride, urea, cupric chloride, and ammonium molybdate in o-dichlorobenzene at about 150° C.; those which contain the —CH₂— linkage may be obtained by sulphonation of the primary and secondary amines of United Kingdom specifications Nos. 717,137 and 724,212; those which contain the —CH₂NR-phenylene- linkage may be obtained by reacting a primary (or secondary N-alkyl or cycloalkyl-)nitroaniline with a phthalocyanine containing chloromethyl and sulphonic or carboxylic acid groups obtained by chloromethylation of a phthalocyanine sulphonic or carboxylic acid, and reducing the product so obtained for example with sodium sulphide or by reacting a chloro-methyl phthalocyanine with for example a diaminobenzenesulphonic acid or -carboxylic acid; those which contain the SO₂NR-alkylene- linkage may be obtained by reacting a phthalocyanine containing chlorosulphonyl groups with a monoacetyl alkylene diamine in the presence of water, and treating the product so obtained (which contains both sulphonamide and sulphonic acid groups) with aqueous alkali to hydrolyse the acetylamino group; those which contain the —SO₂NR-phenylene-CH₂— linkage may be obtained in a similar manner by using an amino-N-benzyl-acetamide in place of the monoacetyalkylene diamine; those which contain the —CH₂.NR-alkylene- linkage may be obtained by reacting a phthalocyanine containing chloromethyl and sulphonic or carboxylic acid groups with a monoacetyl alkylene diamine and treating the product so obtained with aqueous alkali to hydrolyse the acetylamino groups; those containing a direct link, so that the amino group is attached directly to the phthalocyanine nucleus, may be obtained by sulphonating the amino-phthalocyanines described in United Kingdom specification No. 529,847 or where a starting material containing less than 4 amino groups attached to the phthalocyanine nucleus is desired, it may be obtained by heating together a mixture of suitable carboxy- or sulphophthalic acid derivatives with one of the substituted phthalic acid derivatives used as starting materials in United Kingdom specification No. 529,847 under conditions known to be used for the manufacture of phthalocyanines from phthalic acid derivatives, for example by heating the anhydrides with urea and a catalyst for example ammonium molybdate in an organic solvent, for example o-dichlorobenzene, and reducing the nitrophthalicyanine sulphonic or carboxylic acid or hydrolysing the acylaminophthalocyanine sulphonic or carboxylic acid so obtained by known methods for the conversion of aromatic nitro or acylamino compounds to the corresponding amines; and those containing the —CO.NR-phenylene- linkage may be obtained by reacting a phthalocyanine compound containing carboxylic acid chloride groups with a diaminobenzene sulphonic acid or carboxylic acid or with an aminobenzene sulphonic acid or an aminobenzoic acid which also contains a nitro group and reducing the nitro compound so obtained; and those containing the —CO—NR-phenylene-CH₂— linkage may be obtained by reacting a phthalocyanine compound containing carboxylic acid chloride groups with an N-(aminobenzyl-) acetamide and subsequently hydrolysing the product so obtained with aqueous alkali.

Suitable coloured compounds of the nitro series which may be used as starting materials for making the new dyestuffs of the invention are those of the formula:

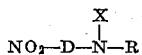

where D stands for a naphthalene or benzene nucleus which may be further substituted wherein the nitrogen atom N is in the ortho position to the nitro group, X stands for hydrogen or for a hydrocarbon radical which may be substituted, R stands for hydrogen or for an organic radical attached to the nitrogen through a carbon atom, and wherein R may be connected to X when X is a hydrocarbon radical or to D, in the ortho position to the nitrogen atom N, to form a heterocyclic ring, which contains at least one amino or mono-substituted amino group and which also contains at least one ionogenic solubilising group.

As specific examples of coloured compounds of the nitro series which may be used there may be mentioned sulphonic acid derivatives of substituted diphenylamines and phenylnaphthylamines, for example 2:4-dinitro-4'-aminodiphenylamine-3'-sulphonic acid, 2-nitro-3'-amino-4'-carboxydiphenylamine-4-sulphonic acid, 2-nitro-4'-(p-aminoanilino-)diphenylamine - 3':4 - disulphonic acid, 2-nitro - 4' - methylaminodiphenylamine - 3':4 - disulphonic acid, 2-nitro-4'-methylamino-4-sulphon-beta-hydroxyethylamidodiphenylamine-3'-sulphonic acid, 2-nitro-4'-methylamino - 4 - carboxydiphenylamine-3'-sulphonic acid, 2-nitro-4'-amino-1'-naphthylphenylamine-4:6' - disulphonic acid and 1:5-dinitro-2:6-di-(4-amino-3-sulphoanilino-) naphthalene. These sulphonic acid derivatives may conveniently be obtained by the reaction of the appropriately substituted o-nitrochloro-benzene or -naphthalene with the appropriately substituted diamine (at least one of the reagents containing a sulphonic acid group), in aqueous or alcoholic media in the presence of an acid binding agent for example calcium carbonate at elevated temperatures for example at a temperature of 100° C.

In the process for making the new dyestuff of the invention, the reactants are dissolved or suspended in a liquid medium, preferably an aqueous medium, and the mixture is stirred until the reaction is complete. It is preferable to add an acid binding agent for example sodium carbonate to the reaction mixture to remove the halogen acid formed during the reaction.

During the manufacture of the new dyestuffs it is generally preferable to carry out the reaction at a temperature above 50° C. and to isolate the new dyestuffs from the media in which they have been formed at a pH of from 6 to 8, and to dry the resultant dyestuff pastes, preferably in the presence of buffering agents suitable for maintaining a pH value of about 6.5. Examples of such buffering agents are mixtures of sodium dihydrogen phosphate and disodium hydrogen phosphate or of disodium hydrogen phosphate and potassium dihydrogen phosphate.

Those new dyestuffs of the invention which contain one or more azo groups may be obtained by an alternative process by coupling a diazonium compound with a coupling component wherein either the diazonium compound or the coupling component, or both, contains at least one ionogenic solubilising group and either the diazonium compound or the coupling component, or both, contains at least one 2:6-dihalogeno-4-pyrimidinylamino- or at least one 4:6-dihalogeno-2-pyrimidinylamino- group.

Suitable coupling components containing these substituents may be obtained from the coupling components containing an amino or mono-substituted amino group by interaction with a 2:4:6-trihalogenopyrimidine using conditions similar to those described above for the process for making the new dyestuffs of the invention.

Suitable diazonium compounds containing these substituents may be obtained from aromatic primary amines containing a second primary amino group by interaction with a 2:4:6-trihalogenopyrimidine using conditions similar to those described above for the process for making the new dyestuffs of the invention.

In carrying out this alternative process, the coupling is preferably carried out at a temperature below 5° C., conveniently at a temperature between 0° C. and 5° C., and at as low a pH as is consistent with efficient coupling in order that side reactions, for example hydrolysis of the halogen atoms remaining attached to the pyrimidine ring, are minimised.

The new dyestuffs of the invention may be used to colour silk, wool, regenerated protein and cellulosic textile materials for example cotton, linen and viscose rayon, by treating the textile material with an aqueous solution (which may be a thickened printing paste) of the dyestuff in conjunction with a treatment with an acid-binding agent, for example sodium hydroxide, potassium phosphate or sodium carbonate. The treatment with the acid-binding agent may be carried out prior to, simultaneously with or after the treatment with the dyestuff.

When the acid-binding agent is applied simultaneously with the dyestuff, it may conveniently be dissolved in the dyestuff solution or the printing paste containing the dyestuff.

The dyestuff solution whether acid-binding agent is present or not, may contain commonly used dyebath adjuvants for example sodium chloride, sodium sulphate, sodium alginate, urea and water-soluble alkyl ethers of cellulose.

The printing paste, whether acid binding agent is present or not, may contain commonly used adjuvants for example urea, and thickening agents for example methyl cellulose, starch and locust bean gum, but an alginate, for example sodium alginate is preferred as thickening agent.

Dyeing in the presence of acid binding agent is preferably carried out at elevated temperatures, for example at temperatures between 70° C. and the boiling point of the dyestuff solution in order to improve the exhaustion and fixation of the dyestuff.

The textile material printed with printing paste containing acid-binding agent is preferably steamed or heated in order to fix the dyestuff on the textile material.

When the acid-binding agent is applied in a separate step before or after the dyestuff, it is preferably applied by treating the textile material with an aqueous solution of the acid-binding agent, for example by a padding technique. The aqueous solutions of acid-binding agents thus used may also contain dyebath adjuvants of the kind mentioned above.

Both the solution of acid-binding agent and the dyestuff solution containing the dyestuff may be applied at room temperature or at an elevated temperature, the textile material being optionally dried between the two treatments; but when dyeing protein or regenerated protein fibres in conjunction with an acid-binding agent it is preferred to use a temperature below 50° C. It is preferred to heat or steam cellulosic textile materials at an elevated temperature, for example at 100° C. or at a higher temperature for a short period of time after application of dyestuff and acid-binding agent to fix the dyestuff on the textile material.

The above processes may be modified by using, in place of the acid-binding agent, a substance which on heating or steaming generates an acid-binding agent, and thereafter subjecting the textile material to heat or steam after the treatment with the dyestuff and the said substance, in order to generate the acid-binding agent.

As an example of a substance which on heating or steaming generates an acid-binding agent, there may be mentioned an alkali metal bicarbonate, for example sodium bicarbonate which on heating or steaming yields sodium carbonate, and also sodium trichloroacetate which on steaming generates sodium carbonate.

The fastness to washing or subsequent wet processing of tohe colourations produced by the process of our invention is in general improved by a scouring treatment in for example a hot aqueous solution of soap and sodium carbonate, followed by rinsing in hot water prior to drying.

The new dyestuffs may also be applied to silk, wool, regenerated protein, polyamide and modified polyacrylonitrile textile materials, by the conventional dyeing methods used for those textile materials, that is by dyeing from weakly acid or neutral dyestuff solutions, for example dyestuff solutions containing acetic acid, sodium sulphate or ammonium acetate, at a temperature above 50° C.

The dyestuffs may also be applied to silk, wool and regenerated protein textile materials by the conventional printing methods used for those materials.

The invention is illustrated but not limited by the following examples in which the parts and percentages are by weight:

Example 1

23.25 parts of the disodium salt of the monoazo dyestuff obtained by coupling one molecular proportion of diazotised 2-naphthylamine-4:8-disulphonic acid with one molecular proportion of m-toluidine, are dissolved in 300 parts of water at 40° C. and the solution is added to a solution of 9.1 parts of 2:4:6-trichloropyrimidine in 150 parts of ethanol. The mixture is heated to 60° C. and stirred for 2½ hours during which time a solution of 2.8 parts of sodium carbonate in 25 parts of water is gradually added. The mixture is cooled to 15° C. and 25 parts of sodium chloride are added. The mixture is then filtered and the residue on the filter is washed with 100 parts of 10% brine solution and dried at room temperature. The dried product is then mixed with 2.0 parts of disodium hydrogen phosphate and 3.6 parts of potassium dihydrogen phosphate.

One molecular proportion of the dyestuff so obtained when treated with hot alcoholic sodium hydroxide solution liberates two atomic equivalents of chloride ion.

Example 2

24.05 parts of the disodium salt of the monoazo dyestuff obtained by coupling one molecular proportion of diazotised 4-amino-toluene-3-sulphonic acid with one molecular proportion of 2-amino-5-naphthol-7-sulphonic acid in alkaline solution are dissolved in 400 parts of water at 50° C. and the solution is added to 9.1 parts of 2:4:6-trichloropyrimidine dissolved in 40 parts of acetone. The mixture is heated to 60° C. and is stirred for 5 hours while a solution of 2.8 parts of sodium carbonate in 25 parts of water is gradually added. The mixture is cooled to 15° C. and 60 parts of sodium chloride are added. The precipitated dyestuff is filtered off and dried at room temperature, and the dried product is then mixed with 2.0 parts of disodium hydrogen phosphate and 3.6 parts of potassium dihydrogen phosphate.

One molecular proportion of the dyestuff so obtained when treated with hot alcoholic sodium hydroxide solution liberates two atomic equivalents of chloride ion.

Example 3

14.6 parts of 2-nitro-4'-aminodiphenylamine-3':4-disulphonic acid, 7.1 parts of 2:4:6-trichlorpyrimidine, 150 parts of water and 120 parts of ethyl alcohol are stirred at the boil under a reflux condenser for 16 hours. The mixture is diluted to 1000 parts with water, then aqueous sodium carbonate solution is added to raise the pH of the solution to 6.4 (about 40 parts of 2 N solution being required). 200 parts of salt are then added and the solution is set aside for several days to await crystallisation of the product. When crystallisation is complete the product is filtered off, washed with 20% aqueous brine and dried at room temperature. A yellow dyestuff is obtained.

Example 4

In place of the 4-amino-2'-nitrodiphenylamine-3:4'-disulphonic acid used in Example 3 there is used 17.8 parts of 2-nitro-4'-methylamino-4-sulphon-beta-hydroxyethylamidodiphenylamine - 3' - sulphonic acid. A similar product is obtained.

Example 5

100 parts of a bleached cotton fabric are padded through a 2% aqueous solution of the dyestuff of Example 1 at 50° C. and squeezed between rollers so that the weight is increased to 200 parts. The fabric is then dried in a hot flue and padded through an aqueous solution containing 1% of sodium hydroxide which has been saturated with sodium chloride at room temperature. It is immediately steamed at 100° C. for 1 minute. The fabric is then washed in hot water, rinsed in a 0.5% aqueous solution of sodium bicarbonate, treated in boiling 0.2% aqueous soap solution for 5 minutes, rinsed in water and dried.

The fabric is coloured bright yellow and is fast to washing and to light.

If the solution of dyestuff used in the above example is replaced by a 1% aqueous solution of the dyestuff of Example 2, the fabric is coloured bright orange and has excellent fastness to washing and to light.

Example 6

90 parts of sodium chloride and 1 part of the dyestuff of Example 1 are dissolved in 3,000 parts of water and 100 parts of viscose rayon yarn are added. The solution is heated to 90° C., and maintained at this temperature for 30 minutes. 300 parts of a 10% aqueous solution of sodium carbonate are then added, and the dyeing is continued for 1 hour. The yarn is then rinsed in cold water, treated for 5 minutes at 95° C. in a 0.3% aqueous solution of a synthetic detergent, rinsed again in cold water and dried. The yarn is dyed a bright reddish-yellow shade of good fastness to washing and to light.

If the dyestuff used in the above example is replaced by the dyestuff of Example 2, the yarn is dyed a reddish-orange shade of good fastness to washing and to light.

Example 7

100 parts of plain weave bleached cotton fabric are padded at room temperature with an aqueous solution containing 1% of the dyestuff of Example 2, 2% sodium bicarbonate and 0.2% of a highly sulphonated oil and squeezed between rollers so that its weight is increased to 200 parts. The fabric is then dried in a hot flue drier at 110° C., and is then rinsed in water, treated for 5 minutes in boiling aqueous 0.2% soap solution, then rinsed again in water and dried.

The fabric is coloured an orange shade which is fast to washing and to light.

Example 8

A printing paste is obtained by mixing together 5 parts of urea, 49 parts of water, 1 part of sodium bicarbonate, 40 parts of 5% aqueous sodium alginate and 5 parts of the dyestuff of Example 1.

The printing paste so obtained is printed on to cotton fabric from a roller, and the fabric is then dried and steamed for 5 minutes. The fabric is then rinsed in water, treated in boiling 0.2% aqueous soap solution for 10 minutes, again rinsed in water and dried.

A bright reddish-yellow print is obtained having very good fastness to washing and to light.

If the dyestuff used in the above printing paste is replaced by an equal weight of the dyestuff of Example 2, there is obtained a bright orange print having very good fastness to washing.

Example 9

A printing paste is obtained by mixing together 5 parts of urea, 50 parts of water, 40 parts of 5% aqueous sodium alginate solution and 5 parts of the dyestuff of Example 1.

This printing paste is applied to mercerised cotton fabric by roller machine printing and the fabric is dried. The dried fabric is then passed through a padding mangle with the printed side of the fabric facing the lower padding roller. This lower roller is partially immersed in an aqueous solution containing 2% of sodium bicarbonate and 0.4% of sodium alginate. The padded fabric is then immediately passed over a series of steam heated drying cylinders. The dried fabric is then rinsed in cold water, treated in boiling 0.2% aqueous soap solution for 5 minutes, again rinsed in cold water and dried. The bright reddish-yellow print so obtained possesses very good fastness to washing and to light.

Example 10

A printing paste is obtained by mixing together 5 parts of urea, 50 parts of water, 40 parts of 5% aqueous sodium alginate solution and 5 parts of the dyestuff of Example 2.

This printing paste is applied to staple viscose rayon fabric by roller machine printing and the fabric is dried. The dried fabric is then passed through a padding mangle with the printed side of the fabric facing the lower padding roller. This lower roller is partially immersed in an aqueous solution containing 2% of sodium carbonate and 0.4% of sodium alginate. The padded fabric is then immediately passed over a series of steam heated drying cylinders. The dried fabric is then rinsed in cold water, treated in boiling 0.2% aqueous soap solution for 5 minutes, again rinsed in cold water and dried. The bright orange print so obtained possesses very good fastness to washing and to light.

Example 11

The printing paste of Example 9 is applied to chlorinated wool fabric by screen printing. The fabric is dried and steamed for 10 minutes, rinsed in cold water, soaped for 5 minutes at 60° C. in a solution containing 2 parts of soap in 1,000 parts of water, rinsed and dried. The yellow print so obtained is fast to washing and to light.

Example 12

A printing paste is obtained by mixing together 10 parts of urea, 25 parts of water, 60 parts of 8% aqueous Gum Tragacanth solution and 5 parts of the dyestuff of Example 2.

This printing paste is applied to natural silk by screen printing. The fabric is dried and then steamed for 10 minutes. The print is then rinsed in cold water and soaped for 5 minutes at 50° C. in a solution containing 2 parts of soap in 1,000 parts of water, rinsed and dried. The bright orange print so obtained is fast to washing and to light.

Example 13

3 parts of the dyestuff of Example 2 are dissolved in 4,000 parts of cold water. 4 parts of 85% formic acid and 100 parts of nylon fabric are added. The dyestuff solution is heated to 95° C. and dyeing continued for 60 minutes. The fabric is then treated for 10 minutes in 4,000 parts of liquor containing 4 parts of soap and 12 parts of soda ash. Finally the fabric is rinsed and dried. The nylon is dyed a bright orange shade.

Example 14

3 parts of the dyestuff of Example 2 are dissolved in 4,000 parts of cold water and 100 parts of modified polyacrylonitrile fabric are added. The temperature is raised to 100° C. and 8 parts of sulphuric acid (specific gravity 1.8) are added slowly. Dyeing is continued for 60 minutes after the last addition of sulphuric acid. The material is then treated for 10 minutes at 85° C. in 4,000 parts of liquor containing 4 parts of soap and 12 parts of soda ash. Finally the material is rinsed in cold water and dried. The fabric is dyed a bright orange shade.

Example 15

3 parts of the dyestuff of Example 1 are dissolved in 4,000 parts of cold water. 100 parts of silk are added to the solution and 100 parts of common salt are added gradually during 30 minutes. 8 parts of sodium carbonate are then added during 15 minutes and dyeing is continued for a further 45 minutes. The silk is then treated with a hot aqueous solution containing 0.2% soap or synthetic detergent, 0.2% sodium carbonate and 0.5% common salt. The fabric is then rinsed and dried. The silk is then dyed to a yellow shade of good fastness to washing.

If the dyestuff used in the above example is replaced by the dyestuff of Example 2 the silk is then dyed to a bright-orange shade of good fastness to washing.

Example 16

A solution of 25.4 parts of the trisodium salt of 1-amino-4 - (4' - amino)anilinoanthraquinone - 2:3':5 - trisulphonic acid in a mixture of 300 parts of water and 80 parts of ethanol is added during 15 minutes to a stirred, boiling solution of 7.7 parts of 2:4:6-trichloropyrimidine in 100 parts of water and 240 parts of ethanol. The reaction mixture is stirred at the boil under a reflux condenser for 24 hours, during which time the acidity to litmus which develops is neutralised by the gradual addition of 10% aqueous sodium carbonate solution. 80 parts of sodium chloride are added, the mixture is stirred for a further 30 minutes at the boil and then allowed to cool with stirring and stand for several hours at room-temperature. The dyestuff which separates is filtered, washed with a mixture (equal parts by vol.) of 20% aqueous sodium chloride solution and ethanol. The product is dissolved in 600 parts of water at 55° C. and the solution screened and the dyestuff is reprecipitated by the addition of sodium chloride at the rate of 1 lb. per gallon; when separation of the dyestuff is complete, it is filtered, washed well with 10% aqueous sodium chloride solution and dried.

Example 17

11.07 parts of copper phthalocyanine 3-(N-3'-amino-4'-sulphophenyl)sulphonamide sulphonic acid (obtained as described below) are dissolved in 500 parts of water at 70° C. and the pH of the solution is adjusted to 7 by the addition of aqueous sodium hydroxide solution. 10 parts of N/10 hydrochloric acid are added, followed by a solution of 3.4 parts of 2:4:6-trichloropyrimidine in 50 parts of dioxan. The mixture is then refluxed for 7 hours, cooled to room temperature, and sufficient aqueous sodium hydroxide solution is added to bring the pH of the solution to 7. 175 parts of salt are added and the precipitated dyestuff is filtered off and dried.

The copper phthalocyanine 3-(N-3'-amino-4'-sulphophenyl) sulphonamide sulphonic acid used in the above example may be obtained as follows: 228 parts of copper phthalocyanine is converted to the tetrasulphonchloride by the method described in Example 1 of United Kingdom specification No. 515,637 and the moist cake is suspended in 3000 parts of ice-water. 336 parts of sodium bicarbonate are added, then a solution of 188 parts of 2:4-diaminobenzene sulphonic acid in 1500 parts of water and 1000 parts of N aqueous sodium bicarbonate solution. The mixture is stirred for 18 hours, during which time the temperature is allowed to rise to 25° C., then the resulting blue solution is acidified by addition of 360 parts of 38% aqueous hydrochloric acid. The mixture is filtered and the solid residue is washed with 2 N aqueous hydrochloric acid and dried to give a blue powder.

What we claim is:

1. Water-soluble colored compounds selected from the group consisting of azo, anthraquinone, phthalocyanine, and nitro-group-substituted water-soluble colored compounds substituted by a member selected from the group consisting of the 2:6-dihalogeno-4-primidylamino radical and the 4:6-dihalogeno-2-pyrimidylamino radical.

2. Water-soluble azo colored compounds substituted by a substituent selected from the group consisting of the 2:6-dihalogeno-4-pyrimidylamino radical and the 4:6-dihalogeno-2-pyrimidylamino radical.

3. Water-soluble anthraquinone colored compounds substituted by a member selected from the group consisting of the 2:6-dihalogeno-4-pyrimidylamino radical and the 4:6-dihalogeno-2-pyrimidylamino radical.

4. Water-soluble colored phthalocyanine compounds substituted by a member selected from the group consisting of the 2:6-dihalogeno-4-pyrimidylamino radical and the 4:6-dihalogeno-2-pyrimidylamino radical.

5. Water-soluble nitro-group-substituted colored compounds substituted by a member selected from the group consisting of the 2:6-dihalogeno-4-pyrimidylamino radical and the 4:6-dihalogeno-2-pyrimidylamino radical.

6. 2-[2'-methyl - 4' - (dichloropyrimidylamino)-phenylazo]-naphthalene-4:8-disulfonic acid.

7. 2-(dichloropyrimidylamino) - 6 - (4'-methylphenylazo)-5-naphthol-2':7-disulphonic acid.

8. 2 - nitro - 4' - (dichloropyrimidylamino)diphenylamine-3':4-disulfonic acid.

9. 2-nitro-4'-N-methyl-N-(dichloropyrimidyl) - amino-4-sulphon-beta - hydroxyethylamido - diphenylamine - 3'-sulfonic acid.

10. 1-amino-4-(4' - dichloropyrimidylamino) - anilinoanthraquinone-2:3'-5-trisulfonic acid.

11. Copper phthalocyanine 3-(N-3'-dichloropyrimidylamino-4'-sulfophenyl)sulfonamide sulfonic acid.

References Cited in the file of this patent

UNITED STATES PATENTS

| 1,862,361 | Dohrn et al. | June 7, 1932 |
| 2,095,600 | Graenacher et al. | Oct. 12, 1937 |

FOREIGN PATENTS

| 315,451 | Great Britain | July 11, 1929 |
| 486,100 | Great Britain | Aug. 25, 1936 |
| 1,129,111 | France | Jan. 16, 1957 |

UNITED STATES PATENT OFFICE
CERTIFICATION OF CORRECTION

Patent No. 2,935,506                               May 3, 1960

Robert Norman Heslop et al.

It is hereby certified that error appears in the above numbered patent requiring correction and that the said Letters Patent should read as corrected below.

Column 12, line 28, for "primidylamino" read -- pyrimidylamino --.

Signed and sealed this 29th day of August 1961.

(SEAL)
Attest:

ERNEST W. SWIDER
Attesting Officer

DAVID L. LADD
Commissioner of Patents